Feb. 24, 1931.   J. BAILEY   1,793,893
METHOD OF AND APPARATUS FOR TREATING GLASS ARTICLES
Filed Nov. 8, 1928   2 Sheets-Sheet 1
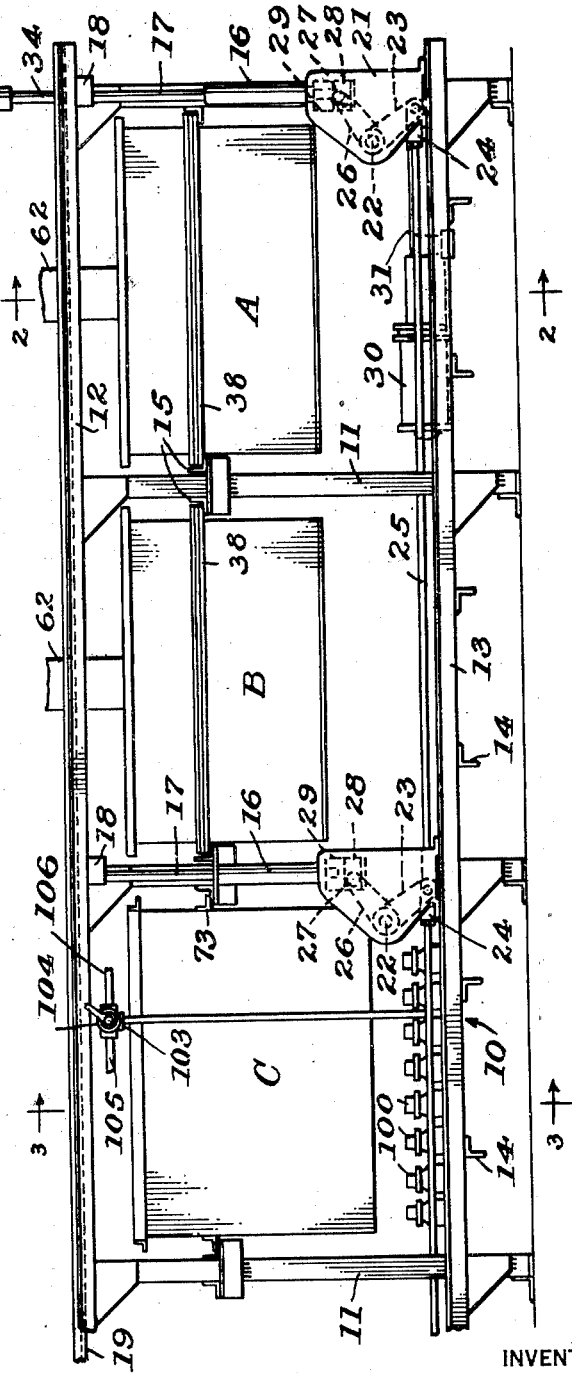
INVENTOR
James Bailey
BY
ATTORNEY Feb. 24, 1931.  J. BAILEY  1,793,893
METHOD OF AND APPARATUS FOR TREATING GLASS ARTICLES
Filed Nov. 8, 1928  2 Sheets-Sheet 2

INVENTOR
James Bailey
BY
ATTORNEY

Patented Feb. 24, 1931

1,793,893

UNITED STATES PATENT OFFICE

JAMES BAILEY, OF CORNING, NEW YORK, ASSIGNOR TO CORNING GLASS WORKS, OF CORNING, NEW YORK, A CORPORATION OF NEW YORK

METHOD OF AND APPARATUS FOR TREATING GLASS ARTICLES

Application filed November 8, 1928. Serial No 318,043.

This invention relates to improvements in a method of and apparatus for treating glass articles, and more particularly for treating hollow articles such as bulbs.

The primary object of the invention is to rapidly and uniformly treat predetermined surfaces of a plurality of articles.

Another object is to preserve intact those surfaces upon which the treatment is not desired.

Still another object is to enable the temperature of the treating fluid to be raised to a high degree without injurious effect upon the mechainsm.

A still further object is to conduct the fumes arising from the treating fluid directly to the open air and thus prevent them from permeating the atmosphere in the immediate vicinity of the treating apparatus.

The above and other objects may be attained by the use of my invention, which embodies among its features a chamber having openings which are closed by the articles to be treated, a duct connected to the chamber and leading through a suitable chamber exhausting means to the outer atmosphere, a nozzle in each opening in the chamber communicating with a fluid reservoir and arranged to direct fluid from the reservoir against the articles, and means for seating the articles over the openings and thereby cause the fluid to pass from the reservoir to the chamber and during its passage to contact with the articles without dislodging them.

In the drawings:—

Fig. 1 is a front view in elevation of a treating apparatus constructed in accordance with this invention and arranged to carry out three steps of treating bulbs; namely, frosting, washing, and drying;

Fig. 4 is a fragmentary perspective view of one of the shafts showing the shaft actuating mechanism;

Fig. 5 is an enlarged detail sectional view through a fragment of one of the cover plates for the treating units.

Frame

Figure 3:
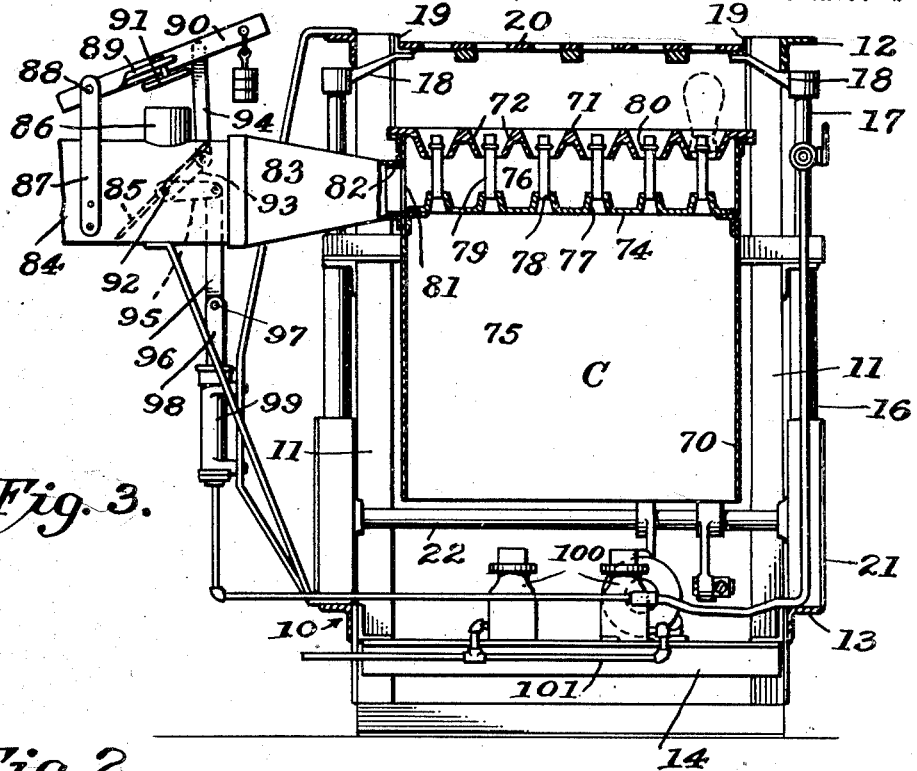
Fig. 3 is a transverse sectional view taken on the line 3—3 of Fig. 1, showing the drying unit in detail.

The complete bulb frosting apparatus herein shown consists of a frosting unit "A", a washing unit "B" and a drying unit "C". These various units are all supported on a suitable frame designated generally 10, which comprises uniformly spaced pairs of standards 11, which are connected together near their upper ends by longitudinally extending angle bars 12. Connecting the standards 11 near their lower ends are longitudinally extending angle bars 13, which are connected to each other at intervals by transversely extending tie bars 14. Oppositely disposed standards are connected intermediate their upper and lower ends by transversely extending angle bars 15, which serve as supports for the units "A", "B" and "C" above referred to.

Secured to certain of the standards 11 are tubular guide members 16, through which push rods 17 operate. The lower ends of these push rods are connected to a system of lifting links by which all of the push rods may be moved in unison. These will be more fully hereinafter described. Secured to the upper ends of the push rods are brackets 18 which extend inwardly and upwardly and support at their innermost ends vertically movable track sections 19, upon which article supporting trays 20 rest.

Secured to the standards 11 at the lower ends of the tubular guide members 16 are plates 21 in which transversely extending shafts 22 are rotatably mounted. These shafts are supported intermediate the upper and lower ends of the plates 21 and are offset, with relation to the longitudinal axes of the push rods 16. Secured to each shaft intermediate at its ends is a lever arm 23 (Fig. 4), the free end of which is pivotally connected by a pivoted fitting 24 to a longitudinally extending bar 25, so that upon movement of one of the shafts, all of the other shafts will move in unison. Secured adjacent the outer end of each shaft 22 is a lever arm 26, carrying at its free end a roller 27 for engagement in a groove 28 formed in a block 29, one of which is secured to the lower end of each push rod 17. It will thus be seen that when rotary motion is applied to any one of the shafts, the push rods 17 will simultaneously move.

In order to supply motive power for rotating the shafts and consequently elevating or lowering the track members 19 and trays 20, a fluid pressure cylinder 30 is secured at any suitable point in the lower portion of the frame 10, and its piston is connected by means of a connecting rod 31 (Fig. 4) to a lever arm 32, which is secured to one of the shafts 22.

The length of the stroke of the push rods 17 and consequently the length of movement of the track members 19 is governed by means of a suitable stop, which is adjustably secured to one of the push rods 17. In its present embodiment, the stop consists of an extension 34 (Fig. 1) on the upper end of one of the push rods which is threaded to enter the internally threaded hub of a hand wheel 35.

Liquid treating units

The frosting and washing units "A" and "B" (Fig. 2) are identical in construction, so that their only difference is the liquid employed, hence only one of the units will be described in detail.

Figures 2, 6:
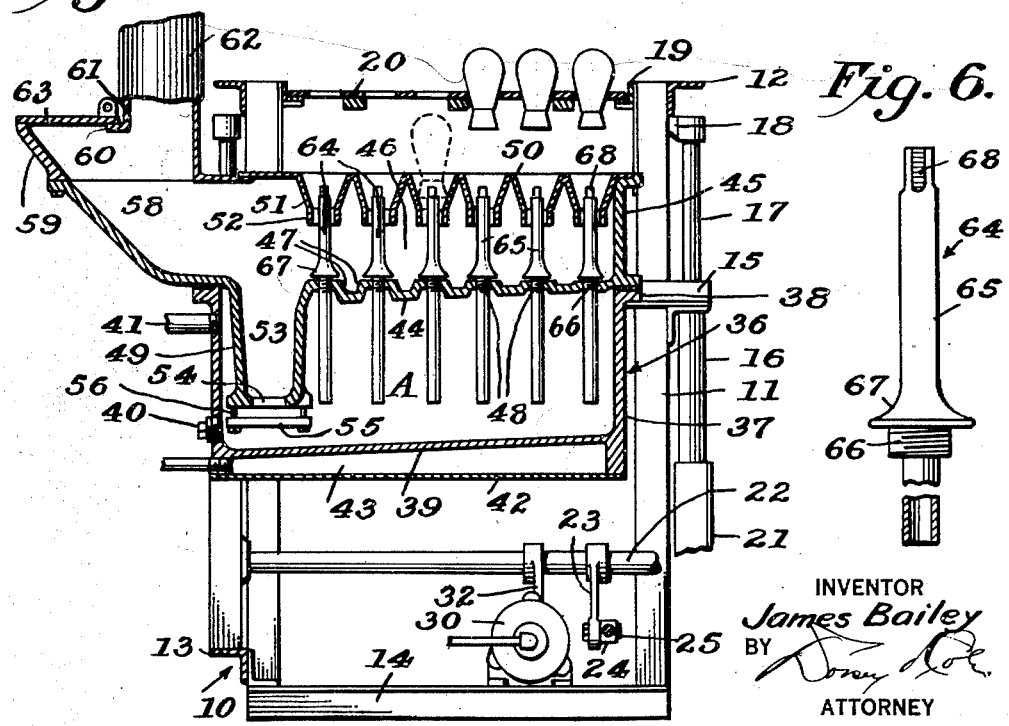
Fig. 2 is a transverse sectional view taken on the line 2—2 of Fig. 1, showing the frosting unit in detail.
Fig. 6 is an enlarged side view partly in section, of one of the spray nozzles.

In Fig. 2 I have shown a typical frosting or washing unit which comprises a tub designated generally 36. This tub consists of a rectangular liquid reservoir 37, having at the upper edges of its side and end walls out-turned flanges 38, which rest on the horizontal flanges of the angle bars 15, and serve to support the unit in place in the frame 10. In order to facilitate draining the contents of the reservoir, its bottom 39 is inclined as shown, and a drain opening is formed in its back wall. This opening is normally closed by a drain plug 40. A suitable vent 41 communicates with the reservoir adjacent to its upper end for admitting air to the reservoir above the level of its liquid contents. The side and end walls of the reservoir are extended downwardly beyond the inclined bottom 39, and secured to their lower ends is a plate 42, forming a chamber 43 to receive a suitable heating fluid by which the contents of the reservoir may be heated.

Secured to the upper end of the reservoir 37 is an inclined partition wall 44, which is formed with upstanding side and end walls 45 to form a chamber 46. Formed integrally with the partition wall 44 is a plurality of upstanding bosses 47, the upper faces of which are arranged in a horizontal plane. Each of the bosses is provided with an internally screw threaded opening 48, for a purpose to be more fully hereinafter described. Extending downwardly from the partition wall 44 near its lowermost end is a tubular projection 49 forming a well 53, which communicates through a port 54 with the reservoir 37. A valve 55 is slidably mounted on suitable guides 56 which are suspended from the lower end of the tubular projection 49, and normally remains in open position as shown.

Secured to the upper ends of the side walls 45 of the chamber 46 is a plate 50, having a plurality of openings, which are arranged in axial alignment with the longitudinal axes of the threaded openings 48. The openings in the plate 50 are surrounded by downwardly projecting flanges 51 (Fig. 5), which taper inwardly and terminate in tubular extensions 52. Thus it will be seen that tapered seats are formed for engagement with the lower ends of the articles which are to be treated.

Formed at the rear of the chamber 46 and opening thereinto, is a chest 58, which is provided with a cap 59 formed with a hand hole 60 and a nipple 61, the latter being connected by a suitable duct 62 to an exhaust fan (not shown). A cover 63 is hinged to the cap 59 in such a position as to normally close the hand hole 60.

In order that the treating fluid may be directed upwardly against or into the articles to be treated, spray nozzles 64 are secured in the threaded openings 48 formed in the bosses 47. Each of these nozzles comprises a tubular body 65 (Fig. 6) provided intermediate its ends with a threaded portion 66, immediately above which is an annular deflecting flange 67. The upper end of each body 65 is provided with flats 68 to facilitate positioning the nozzle in its respective opening. These nozzles are threaded into the threaded openings in the bosses 47, so that their upper ends are slightly below the planes of the plates 50, while their lower ends are disposed in close proximity to the bottom 39 of the reservoir 37, as it is necessary for the proper operation of the device that the lower ends of the nozzles must be submerged in the liquid contained in the reservoir.

Drying unit

The drying unit "C" (Fig. 3) consists of a hollow rectangular shell 70, which is provided at its upper ends with a plate 71. Like the plate 50 before described, the plate 71 is formed with a plurality of openings surrounded by depending convergent flanges 72, forming funnel-shaped seats for the articles to be treated. Secured to the outer sides of the end walls of the shell 70 are angle bars 73, which engage certain of the angle bars 15 of the frame 10 to support the unit in proper position. A horizontal partition wall 74 is secured within the shell 70 in spaced relation to the plate 71, and divides the unit into a lower storage chamber 75 and an upper chamber 76. Like the partition walls 44 of the units "A" and "B", the partition wall 74 is formed with upwardly extending bosses 77, which are apertured at 78 to receive discharge nozzles 79, it being understood that the longitudinal axes of the bosses 77 align with the longitudinal axes of the flanged openings formed in the plate 71. Arranged on the nozzles 79 slightly below their upper ends, which are disposed near the plane of the plate 71, are deflecting flanges 80, which will cause fluid coming in contact therewith to be deflected outwardly toward the convergent flanges 72.

Formed in the back wall of the chamber 76 is an opening 81, which is surrounded by a collar 82. One end of a sleeve 83 is fitted to the collar 82 and its opposite end is connected to a duct 84, which is in turn connected to an exhaust fan (not shown). Arranged within the duct 84 near the sleeve 83 is a butterfly valve 85 and formed in the sleeve directly above the butterfly valve is an opening surrounded by a collar 86. A pair of standards 87 are secured to the duct near the collar 86 for supporting a shaft 88 upon which the lever arms 89 and 90 are pivotally mounted. These arms are connected together so as to move in unison, and suspended from the free end of the arm 89 is a valve 91 for seating on the upper end of the collar 86, and preventing the entrance of air thereinto. The butterfly valve 85 is secured to a shaft 92 which extends transversely through the duct 84, and secured to one end of this shaft for movement in unison with the butterfly valve is a lever 93, the free end of which is connected by a link 94 to the lever arm 90. Secured to the end of the shaft opposite that carrying the lever 93 is a lever 95, having pivoted to its free end a connecting rod 96, which is in turn pivoted at 97 to the piston rod 98 of a cylinder 99, which is secured to a bracket carried by the frame 10.

Supported directly beneath the lower open end of the chamber 75 is a plurality of burners 100 (Fig. 3), which may be supplied with any suitable fuel through a fuel supply pipe 10. These when lighted will supply heated air and products of combustion to the interior of the chamber 75, which acts as a reservoir therefor.

The cylinders 30 and 99 are connected by suitable piping to the port 103 of a control valve 104 which is arranged at some convenient point on the frame 10. This valve is preferably of the three-way type and its port 105 is connected to a source of fluid pressure (not shown) while its port 106 acts as an exhaust by which the cylinders may be emptied of their contents.

Operation

In operation, trays containing the articles to be treated are placed in the track sections 19 which are normally held in elevated position by fluid pressure within the cylinder 30. The valve 104 is then manipulated to permit the fluid contained in the cylinder to flow out so that its piston may be moved inwardly by the weight of the track sections 19 and their attendant mechanism. The lowering of the track sections 19 also lowers the articles 107 into such position as to close the openings in the plates 50. As soon as this occurs, the pressure within the chambers 46 of units "A" and "B" is reduced below atmospheric pressure so that liquid contained within the reservoirs 37 of said units will be forced upwardly through the nozzles 64 and against the inside surfaces of the articles. Due to the lowering of the pressure within the chamber, it will be seen that any tendency of the streams of liquid playing upon them to cause them to become dislodged will be counteracted by the pressure of the external atmosphere so that the articles may be treated with great rapidity without danger of bringing the treating fluid into contact with those surfaces of the articles which are to remain intact. After treating the articles, the valve 104 is again manipulated to admit fluid pressure to the cylinder 30 to expel its piston and return the track sections 19 and tray to the normal elevated position. Simultaneously with the draining of the cylinder 30 and the lowering of the track sections 19, the cylinder 99 is also drained. This permits its piston to retract so as to open the valve 85 and close the valve 91. With the valve 85 open, the pressure in the chamber 76 is reduced, causing the heated air and products of combustion previously accumulated in the storage chamber 75 to enter the nozzles 79 and sweep the articles free from moisture. While any of the units "A", "B" or "C" may be used independently, I prefer to arrange them in batteries so that the frosting, washing and drying steps may be performed simultaneously and progressively, it being understood that separate and independent trays 20 having an article supporting capacity equal to the treating capacity of any single unit are used. These trays are slid longitudinally of the track sections 19 to successively present their contents to the frosting, washing and drying processes.

In some instances it has been found desirable to subject the frosted articles to a "fortifying" treatment by which their mechanical strength is considerably increased over that of the plain frosted article. In such an event I find it desirable to use a frosting unit, a washing unit, a fortifying unit, a second washing unit and finally a drying unit, it being understood that the liquid handling units are all the same construction.

By seating the glass articles directly over the nozzles and resorting to evacuation of the chambers to create a flow of the treating fluid, I elmininate any tendency to lift the articles from their seats and spatter their surfaces which are to remain intact with the frosting solution. Moreover by immersing the valve 55, I avoid any tendency of the frosting solution to spray up into the chamber 46, except through the spray nozzles, and the valve becomes automatic so that no external control means is necessary.

While in the foregoing there has been shown and described the preferred embodiment of this invention, it is to be understood that minor changes in the details of the construction, combination and arrangement of parts may be resorted to without department from the spirit and scope of the invention as claimed.

I claim:

1. The method of treating glass articles which includes supporting them over openings in a chamber partially exhausting the chamber and admitting treating fluid to the chamber under atmospheric pressure and spraying the fluid against the articles.

2. The method of treating the entire interior surfaces of hollow glass articles which includes partially exhausting them and spraying a treating fluid into them under atmospheric pressure.

3. The method of treating the entire interior surfaces of hollow glass articles which includes supporting them inverted over openings in a chamber, partially exhausting the chamber, and admitting treating fluid to the chamber through spray nozzles which spray the fluid against the entire interior surfaces of the articles.

4. In an apparatus for treating glass articles, a series of partially exhausted treating units provided with openings and means for simultaneously advancing a plurality of articles into position to cover the openings.

5. In an apparatus for treating glass articles, a series of independent partially exhausted treating units provided with openings, means for supporting a plurality of articles over the openings and means for actuating the article supporting means to simultaneously advance the articles into position to cover the openings.

6. In an apparatus for treating glass articles, a series of partially exhausted treating units, having openings, article supporting trackways associated with said units and means to simultaneously move the trackways toward or away from the treating units, to move articles carried thereby into or out of closing position with relation to the openings.

7. In an apparatus for treating glass articles, the combination with a series of treating units each including a partially exhausted chamber having openings therein, a fluid reservoir and nozzles aligned with the openings for establishing communication between the reservoir and chamber, of means for simultaneously advancing a plurality of articles into position to close the openings and cause the fluid to pass through the nozzles and into the chamber.

8. In an apparatus for treating glass articles, a series of treating units each including a partially exhausted chamber having openings in one side, a reservoir, and a plurality of nozzles aligned with the openings and establishing communication between the chamber and reservoir, trackways for supporting articles over the openings and means for moving said trackways in unison toward or away from the treating units to move the articles into and out of closing relation with the openings.

9. In an apparatus for treating glass articles, a partially exhausted chamber having openings which are adapted to be closed by the articles to be treated, a treating fluid containing reservoir and nozzles aligned with the openings for establishing communication between the reservoir and chamber, whereby treating fluid will be directed against the articles when the openings are closed by them.

10. In an apparatus for treating glass articles, a partially exhausted chamber having openings which are adapted to be covered by the articles to be treated, a treating fluid containing reservoir, nozzles aligned with the openings for establishing communication between the reservoir and the chamber and means to return the treating fluid from the chamber to the reservoir.

JAMES BAILEY.